(12) United States Patent
Hosokawa

(10) Patent No.: US 6,334,969 B1
(45) Date of Patent: Jan. 1, 2002

(54) METHOD OF MANUFACTURING FOAMED SEAT PAD WITH FLAT FASTENER

(75) Inventor: Takeshi Hosokawa, Kanagawa (JP)

(73) Assignee: Ikeda Bussan Co., Ltd., Ayase (JP)

( * ) Notice: Subject to any disclaimer, the term of this patent is extended or adjusted under 35 U.S.C. 154(b) by 0 days.

(21) Appl. No.: 09/560,345

(22) Filed: Apr. 28, 2000

(30) Foreign Application Priority Data

Apr. 30, 1999 (JP) .............................. 11-123666

(51) Int. Cl.⁷ ................................................ B29C 44/12
(52) U.S. Cl. ..................... 264/46.4; 264/271.1; 264/275
(58) Field of Search ................. 264/46.4, 259, 264/271.1, 275

(56) References Cited

U.S. PATENT DOCUMENTS

| 4,673,542 A | * | 6/1987 | Wigner et al. | ............... 264/275 |
| 4,802,939 A | * | 2/1989 | Billarant et al. | ............ 264/46.4 |
| 4,814,036 A | * | 3/1989 | Hatch | ......................... 264/46.4 |
| 5,286,431 A | * | 2/1994 | Banfield et al. | ............. 264/275 |
| 5,342,569 A | * | 8/1994 | Murasaki | ..................... 264/259 |
| 5,972,465 A | | 10/1999 | Ohno et al. | .................. 428/100 |
| 6,045,731 A | | 4/2000 | Matsuoka | ................... 264/46.4 |

FOREIGN PATENT DOCUMENTS

| JP | 61-57318 | * | 3/1986 | ................ 264/46.4 |
| JP | 7-148007 | | 6/1995 | |
| JP | 2704859 | | 10/1997 | |

* cited by examiner

Primary Examiner—Allan R. Kuhns
(74) Attorney, Agent, or Firm—Foley & Lardner

(57) ABSTRACT

A seat pad with a fastener is manufactured by forming a groove in a mold, arranging a longitudinal end of the groove, disposing the fastener on the mold to have the surface of the fastener facing the groove, curving a longitudinal end of the fastener to protrude in the mold, and injecting a forming synthetic resin into the mold.

7 Claims, 2 Drawing Sheets

METHOD OF MANUFACTURING FOAMED SEAT PAD WITH FLAT FASTENER

BACKGROUND OF THE INVENTION

The present invention relates to a vehicle seat, and more particularly, to a method of manufacturing a foamed seat pad having a flat fastener integrated therewith and a seat with the pad resulting therefrom.

Conventionally, a seat such as a vehicle seat includes a pad made of urethane foam or the like and a skin disposed thereon. In order to attach the skin to the pad, a wire is inserted in and formed with the pad, and is fixed to the skin by a mounting hardware such as a C-shaped clip and a hog ring.

In recent years, a novel fastening structure is proposed, for example, in U.S. Pat. No. 5,972,465 issued Oct. 26, 1999 to Ohno et al. and U.S. Pat. No. 6,045,731 issued Apr. 4, 2000 to Matsuoka. The structure comprises a flat fastener including an engagement portion formed on the surface of a belt-like base and having a plurality of engagement protrusions and an embedded portion formed on the back of the base and having a plurality of embedded elements. The fastener is embedded in the surface of a pad by means of molded-in forming. And the engagement portion is engaged with the back of a skin for positioning thereof.

However, the structure wherein a wire is inserted in and formed with the pad, and is fixed to the skin by a mounting hardware needs a number of tools which complicate work, resulting in deteriorated workability. Moreover, metal parts are mixedly arranged in the pad, resulting in not only uneasy disassembly of the pad, but poor recyclability and cost efficiency thereof.

The structure using a flat fastener has the drawback that the fastener can separate from the skin, making positioning of the skin difficult.

It is, therefore, an object of the present invention to provide a method of manufacturing a foamed seat pad having a flat fastener integrated therewith, which ensures not only excellent recyclability and cost efficiency thereof, but excellent positioning of a skin.

SUMMARY OF THE INVENTION

An aspect of the present invention lies in providing a method of manufacturing a seat pad with a fastener, comprising the steps of:

forming a groove in a mold;

arranging a longitudinal end of said groove;

disposing the fastener on said mold to have a surface of the fastener facing said groove;

curving a longitudinal end of the fastener to protrude in said mold; and injecting a forming synthetic resin into said mold, whereby the seat pad is obtained, having said longitudinal end of the fastener embedded in said seat pad.

DETAILED DESCRIPTION OF THE INVENTION

Figure 1:
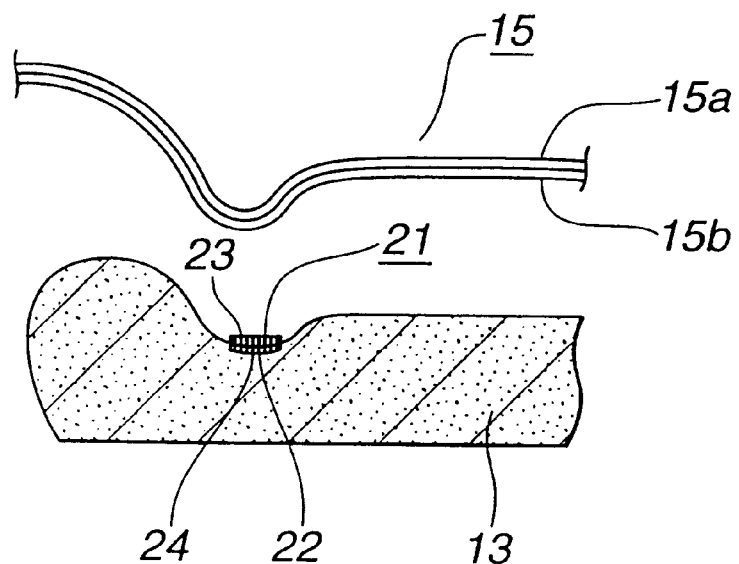
FIG. 1 is a fragmentary longitudinal section showing a seat including a skin and a pad embodying the present invention.

Referring to the drawings, a description will be made with regard to embodiments of a method of manufacturing a foamed seat pad having a flat fastener integrated therewith and a seat with the pad resulting therefrom.

Figure 2:
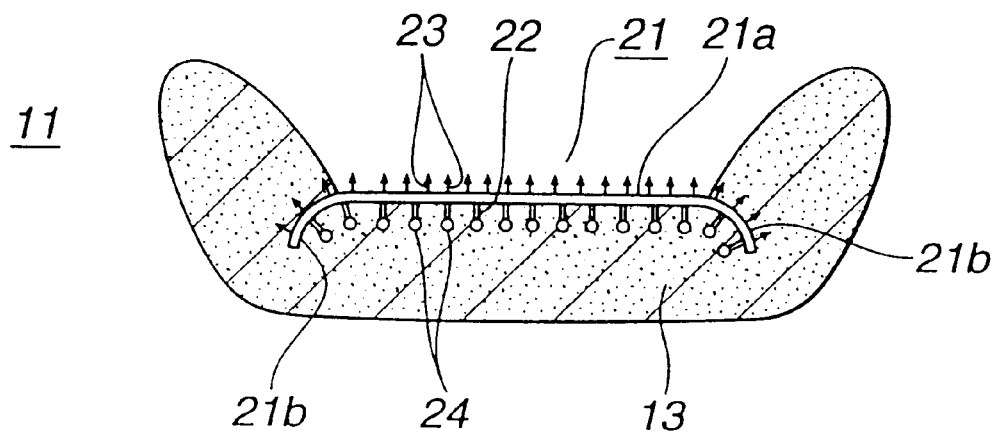
FIG. 2 is a cross section showing the pad having a flat fastener integrated therewith.

Referring to FIGS. 1–2, a vehicle seat 11 includes a pad 13 mounted to a seat frame, not shown, and a skin 15 disposed thereon. The pad 13 is obtained by means of foaming, having a belt-like flat fastener 21 integrated therewith. Specifically, the pad 13 is made such that the fastener 21 is disposed in a foam mold 31, and a foaming synthetic resin is injected therein to obtain the pad 13 having the fastener 21 integrated therewith. For positioning of the skin 15, the back of the skin 15 is engaged with the surface of the fastener 21.

The skin 15 includes a skin portion 15a arranged on the surface and a backing portion 15b arranged on the back. The skin 15 may include a single layer or three layers. The fastener 21 is formed to correspond to a pulled portion, a pattern juncture or the like of the skin 15. The skin 15 may include a counter-engagement portion on the back to face the fastener 21 for engagement therewith.

As seen in FIG. 2, the fastener 21 includes a belt-like base 22 made of a synthetic resin, an engagement portion 23 formed on the surface of the base 22 and having a plurality of engagement protrusions with a head of wedge-like or mushroom-like section, and an embedded portion 24 formed on the back of the base 22 and having a plurality of embedded elements with a head of mushroom-like or circular section. The structures of the engagement portion 23 and the embedded portion 24 are not limited to those as shown in FIG. 2. By way of example, the embedded elements of the embedded portion may be of different lengths.

The fastener 21 is arranged such that the whole of the embedded portion 24 is embedded in the pad 13, and the principal part of the engagement portion 23 arranged on the surface of a main portion or longitudinally center portion 21a of the fastener 21 is exposed on the surface of the pad 13.

Both longitudinal ends 21b of the fastener 21 are curved or bent inward of the pad 13 to be embedded therein. In the embodiment, inward curvature or bend is carried out with respect to the both ends 21b. Alternatively, it may be carried out with respect to only one end 21b.

Figure 3:
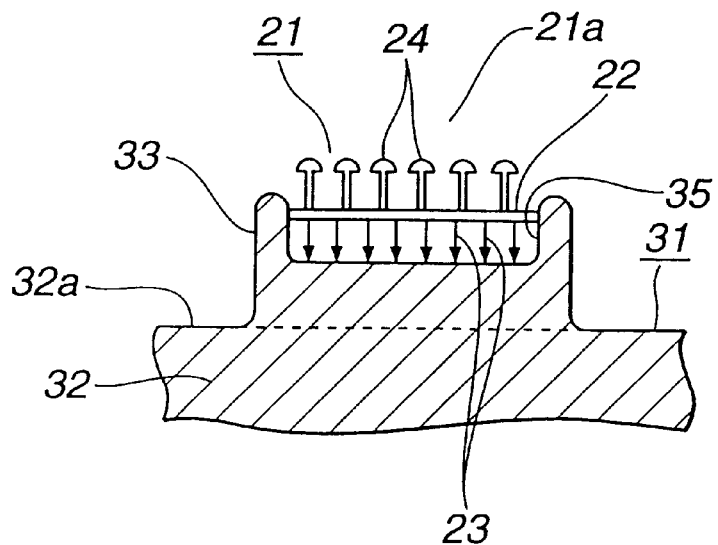
FIG. 3 is an enlarged fragmentary section showing the fastener disposed in an U-shaped groove of a female mold.
Figure 4:
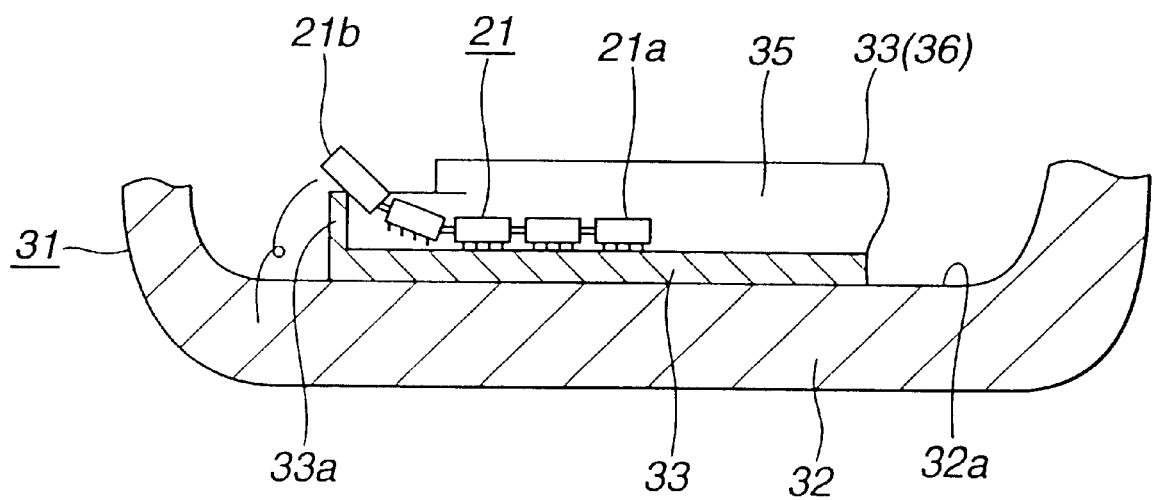
FIG. 4 is a view similar to FIG. 1, showing a foam mold in which an end of the fastener is disposed on a wall of the female mold.

Referring to FIGS. 3–4, a description will be made with regard to the method of manufacturing the foamed seat pad 13 having the flat fastener 21 integrated therewith.

As shown in FIG. 3, a groove 35 of U-shaped section is formed in a female mold 32 of the foam mold 31. The groove 35 is arranged in a convex portion 33 that protrudes upward from a molding surface 32a of the female mold 32. The groove 35 may be formed in a female mold with no convex portion 33.

In the embodiment as shown in FIG. 3, the convex portion 33 is integrally formed with the female mold 32 to obtain the groove 35 therein. Alternatively, as shown in FIG. 4, a detachable guide 36 may separately be arranged with the female mold 32 to obtain the groove 35 therein.

In the embodiment as shown in FIG. 4, a wall 33a is formed at each longitudinal end of the groove 35.

Alternatively, the wall 33a may be eliminated or replaced with a crosspiece. The crosspiece can be arranged vertically adjustably.

The fastener 21 is disposed such that principal part of the engagement portion 23 arranged on the surface of the main portion 21a faces the groove 35 of the female mold 32. Each end 21b of the fastener 21 is in close contact with the groove 35 to prevent the entry of the foaming synthetic resin.

As shown in FIG. 4, each end 21b of the fastener 21 is disposed on the wall 33a of the groove 35 of the convex portion 33 for upward curvature, obtaining the end 21b protruding in the foam mold 31. In the case where a crosspiece is disposed at each end of the groove 35, each end 21b of the fastener 21 is disposed on the crosspiece.

In the case where the guide 36 is arranged with the female mold 32 to obtain the groove 35 therein, each end 21b of the fastener 21 is disposed on the upper end of the wall 33a of the guide 36.

The foaming synthetic resin is injected into the female mold 32 of the foam mold 31 to obtain the pad 13 having the fastener 21 integrated therewith. Through this foaming of the pad 13, the embedded portion 24 formed on the back of the base 22 of the fastener 21 is embedded in the pad 13. Moreover, each end 21b of the fastener 21, which is curved or bent inward of the pad 13, is embedded therein.

In the embodiment, in order to curve or bend both ends 21b of the fastener 21, they are disposed on the walls 33a of both ends of the convex portion 33. Alternatively, a fastener with previously curved or bent ends 21b may be applied without arranging any walls 33a.

Having described the present invention with regard to the preferred embodiments, it is noted that the present invention is not limited thereto, and various changes and modifications can be made without departing the scope of the present invention. By way of example, in the embodiment, the present invention is applied to a seat cushion. Alternatively, the present invention is applicable to a seat back.

The entire contents of Japanese Patent Application P11-123666 are incorporated herein by reference.

What is claimed is:

1. A method of manufacturing a seat pad with a fastener, comprising the steps of:

disposing a structure on a bottom of a mold to define a groove inside the mold;

disposing the fastener on said mold to have a surface of the fastener facing said groove;

curving a longitudinal end of the fastener to protrude inwardly into said mold; and injecting a foaming synthetic resin into said mold, whereby the seat pad is obtained, having said longitudinal end of the fastener embedded in the seat pad.

2. The method as claimed in claim 1, wherein said curving step is carried out with the fastener having said longitudinal end previously curved.

3. The method as claimed in claim 1, wherein said structure is integrally formed with said mold.

4. The method as claimed in claim 1, wherein said structure is a component different from said mold.

5. The method as claimed in claim 1, wherein said structure comprises an end portion.

6. The method as claimed in claim 5, wherein said curving step is carried out by placing said longitudinal end of the fastener on said end portion of said structure.

7. A method of manufacturing a seat pad with a fastener, comprising the steps of:

disposing a fastener into a groove formed in a surface of said mold;

curving a longitudinal end of the fastener to protrude away from the groove and inwardly into said mold so as to engage an end portion of said groove, form a closed air space in said groove, and prevent synthetic resin from entering the air space; and injecting a foaming synthetic resin into said mold, whereby the seat pad is formed having the longitudinal end of the fastener embedded in the seat pad.

* * * * *